US011641287B1

(12) United States Patent
Padden et al.

(10) Patent No.: US 11,641,287 B1
(45) Date of Patent: May 2, 2023

(54) LOCAL COMMUNICATIONS NETWORK

(71) Applicant: Cable Television Laboratories, Inc., Louisville, CO (US)

(72) Inventors: Joseph Padden, Boulder, CO (US); Luther E. Smith, Fort Lupton, CO (US); David Daniel Smith, Louisville, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 260 days.

(21) Appl. No.: 16/936,276

(22) Filed: Jul. 22, 2020

Related U.S. Application Data

(60) Provisional application No. 62/876,993, filed on Jul. 22, 2019.

(51) Int. Cl.
*H04N 21/61* (2011.01)
*H04L 12/28* (2006.01)
*H04N 7/173* (2011.01)

(52) U.S. Cl.
CPC ..... *H04L 12/2801* (2013.01); *H04N 7/17309* (2013.01); *H04N 21/6118* (2013.01); *H04N 21/6168* (2013.01)

(58) Field of Classification Search
None
See application file for complete search history.

(56) References Cited

U.S. PATENT DOCUMENTS 9,954,731 B2 * 4/2018 Siripunkaw ...... H04N 21/42676

FOREIGN PATENT DOCUMENTS

WO    WO-2013019354 A1 * 2/2013    ............. H04B 10/03

* cited by examiner

*Primary Examiner* — Omar S Parra
(74) *Attorney, Agent, or Firm* — David Daniel Smith (57) ABSTRACT

A local communication network (LCN) is contemplated. The LCN may be established within an existing network by leveraging network capabilities in order to facilitate local communications of the type whereby point-to-point (P-to-P) or other types of messaging and/or signaling may be communicated directly between devices without having to be relayed through a headend, a termination system or other processing entity.

13 Claims, 6 Drawing Sheets

LOCAL COMMUNICATIONS NETWORK

CROSS-REFERENCE TO RELATED APPLICATIONS

This application claims the benefit of U.S. provisional application No. 62/876,993 filed Jul. 22, 2019, the disclosure of which is incorporated in its entirety by reference herein.

TECHNICAL FIELD

The present invention relates to facilitating communications within a network, such as but not necessarily limited to leveraging network capabilities to facilitate local communications of the type whereby point-to-point (P-to-P) or other types of messaging and/or signaling may be communicated directly between devices without having to be relayed through a headend, a termination system or other processing entity.

BACKGROUND

A communication network may correspond with virtually any type of wired and/or wireless infrastructure whereby devices may communicate with each other over a communication medium. Some communication networks may include the communication mediums arranged in such a manner that messaging, signaling, information, etc. may be required to traverse certain pathways in order to reach a desired destination. The time and resources consumed when supporting the infrastructure needed to facilitate propagating signaling throughout the pathway needed to reach the desired destination can be inefficient when a topology of the communication network requires the signaling to travel an indirect route versus a more direct route. Some communication networks require use of indirect routing due to a headend, a termination system or other intermediary type of processing entity being relied upon to relay the signaling between the source and the destination.

The indirect routing can result in signaling traveling a longer path to a destination than the signaling would otherwise have to travel if a more direct path was taken. One non-limiting aspect of the present invention contemplates ameliorating the inefficiencies of indirect routing with use of a local communications network (LCN) of the type whereby messaging, signaling, information, etc. may improve upon inefficiencies with more direct communications.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
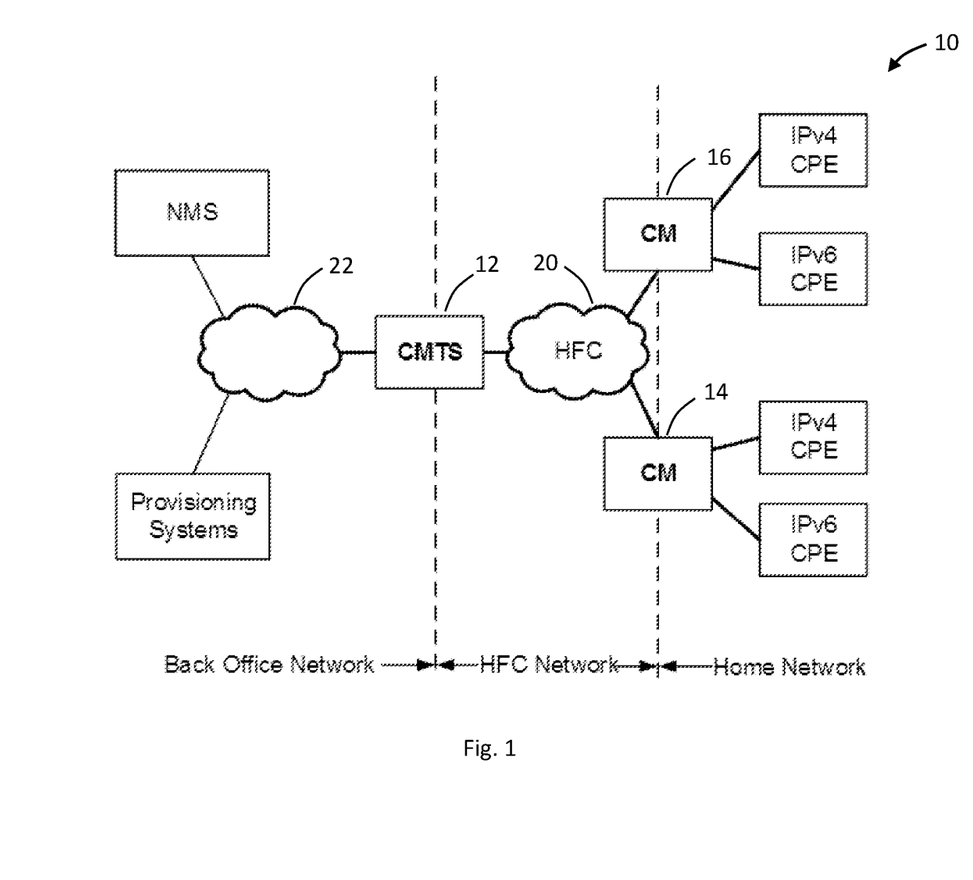
FIG. 1 illustrates a network having local communication capabilities in accordance with one non-limiting aspect of the present invention.

FIG. 1 illustrates a network 10 having local communication capabilities in accordance with one non-limiting aspect of the present invention. While the present invention fully contemplates its use and application in establishing local communications within virtually any type of wired and/or wireless network, the illustrated network 10 is predominantly described for exemplary non-limiting purposes with respect to being a coaxial-based broadband access network, which may take the form of either an all-coax or hybrid fiber/coax (HFC) network that may be generically referred to as a cable infrastructure or a cable network. The cable network 10 may use a tree-and-branch architecture with analog transmission to facilitate two-way transmission, e.g., full-duplex (FDX), and optical/electrical spacing between a cable modem termination system (CMTS) 12 and cable modems (CMs) 14, 16 of up to 100 miles in each direction, although a more typical maximum separation may be 10-15 miles. The cable infrastructure of the network 10 may require customer premise equipment (CPE) or other devices at the end of the network 10 interfacing with customers to relay messaging, signaling, information, etc. (collectively referred to as messaging) to the CMTS 12 whereafter the CMTS 12 may then direct the messaging to a desired destination. While the present invention contemplates utilizing FDX operations of this type to facilitate local communications, the present invention is not necessarily so limited fully contemplates its use and application in non-FDX type of networks and/or networks having non-cable infrastructures.

In the exemplary cable infrastructure, the CMTS 12 may be relied upon to relay messaging between a source device and a destination device, such as when facilitating messaging between a first CM 14 and a second CM 16. This may require the messaging to travel up to 100 miles over the HFC network from the first CM 14 to the CMTS 12 before being indirectly relayed back from the CMTS 12 to the second CM 16. One non-limiting aspect of the present invention contemplates ameliorating inefficiencies associated with such indirect communications by optionally facilitating more direct messaging between the first and second CMs 14, 16 using local communications, i.e., communications sufficient to enable messaging between the first and second CMs 14, 16 without the messaging having to be relayed through the CMTS 12. The capability of the present invention to facilitate point-to-point (P-to-P) or broadcasts/multicast communications of this type and independently of messaging relay through the CMTS 12 may improve latency, reduce bandwidth consumption, provide greater quality of service (QoS) and/or enable CPE to engage in activities, particularly activities dependent on high data rates or low latency, that the CPE would otherwise be unable to engage or adequately support if the attendant messaging required relay through the CMTS 12 or other such intermediary.

The network 10 may be described as including portions for a home network, an HFC network 20 and a back office network where the CMTS 12 may be characterized as an intermediary processing entity between the HFC network and the back office network. The back office network may include a core network 22 or other type of network to facilitate interfacing the HFC network 22 with the Internet (not shown), a network management system (NMS) and a provisioning system may be included to facilitate network operations. This type of cable infrastructure may be particularly beneficial in facilitating communications in compliance with Data-Over-Cable Service Interface Specifications (DOCSIS®) 4.0, such as in accordance with the Physical Layer Specification, CM-SP-PHYv4.0-I02-200429, and MAC and Upper Layer Protocols Interface Specification, CM-SP-MULPIv4.0-I02-200429, the disclosures of which are hereby incorporated in their entireties by reference herein. The DOCSIS 4.0 series of specifications may be utilized to facilitate FDX DOCSIS PHY layer technology as an expansion of the OFDM PHY layer introduced in the DOCSIS 3.1 to increase upstream capacity without significant loss of downstream capacity. The CMs 14, 16 may connect to the operator's HFC network 20 and to a home network, bridging packets between them so that CPE devices can connect to the CMs' LAN interfaces. The CPE can be embedded with the CM in a single device, or they can be separated into standalone devices, as shown, and may use IPv4, IPv6 or both forms of IP addressing (typical CPE are gateways, home routers, set-top devices, personal computers, etc.). The CMTS 12 can connect the operator's back office and core network 22 to the HFC network 20 such that the CMTS's main function is to forward packets (e.g., messaging) between these two domains, and optionally to forward packets between upstream and downstream channels on the HFC network 20.

One non-limiting aspect of the present invention contemplates enabling the CMTS 12 and the CMs 14, 16 to facilitate local communications whereby reliance on the CMTS 12 to relay messaging between domains may be ameliorated for some types of traffic in order to provide more direct communication between end points, e.g., to enable the first CM 14 to communicate directly with the second CM 16 without the attendant messaging having to be relayed through the CMTS 12. To facilitate such local communications, the network 10 may be configured to enable the CMs 14, 16 to process downstream (DS) messaging as defined in DOCSIS® 4.0 and to also deviate from certain aspects of DOCSIS® 4.0 for purposes of processing upstream (US) messaging. The CMs 14, 16 and CMTS 12 may leverage the capabilities of DOCS IS® 4.0 to facilitate establishing protocols, signaling parameters/characteristics and other mechanisms to facilitate transmission of DS and US messaging. In this manner, rather than ignoring US messaging as is typically done in DOCSIS® 4.0 and without having to significant deviate from US and DS communication protocols, the present invention contemplates enabling CMs 14, 16 through software and/or hardware updates and/or re-configurations to process US and/or DS messaging for purposes of facilitating local communications, i.e., messaging between CMs 14, 16 without relay through the CMTS 12.

Figure 2:
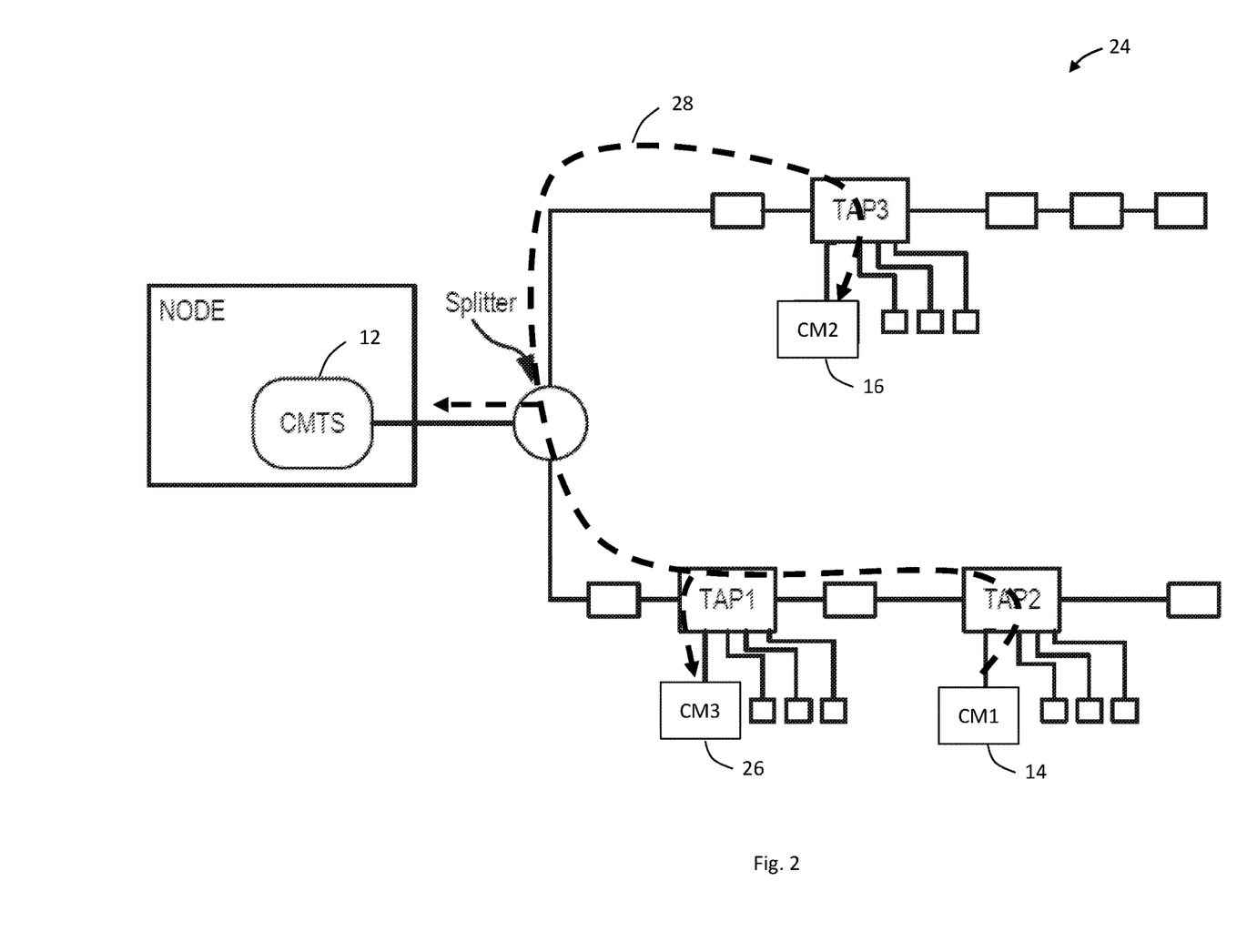
FIG. 2 illustrates a local communication network (LCN) in accordance with one non-limiting aspect of the present invention.

FIG. 2 illustrates a subset of the network 10 being used to establish a local communication network (LCN) 24 in accordance with one non-limiting aspect of the present invention. While the subset is shown, the LCN 24 may correspond with any wired and/or wireless communication mediums used within the network 10 capable facilitating direct communications between CMs 14, 16, 26, which for illustrative purposes is shown to correspond with use of a cable infrastructure to facilitate wired communications between the CMs 14, 16, 26 without having to rely on the CMTS 12 to relay the attendant messaging. A path 28 through the LCN 24 may be represented with a dashed line to indicate direct transmission of messaging from the first CM 14 to the second CM 16 without relay or looping through the CMTS 12. The messaging may correspond with the first CM 14 transmitting a message upstream (US signaling) toward the CMTS 12 whereafter a tap may relay the message to a third CM 26 and a splitter may relay the message towards the CMTS 12 and the second CM 16. The splitter and one or more taps may be included within the network 10 to facilitate directionally coupling US and DS messaging/signaling through the illustrated tree-and-branch architecture or other infrastructure associated with the LCN 24. The splitter and tap are shown for illustrative purposes to describe devices typically found within a network for directing signaling and may be differentiated from each other based on an amount of isolation provided and/or an amount of loss associated with routing signaling between inputs/outputs.

Figure 3:
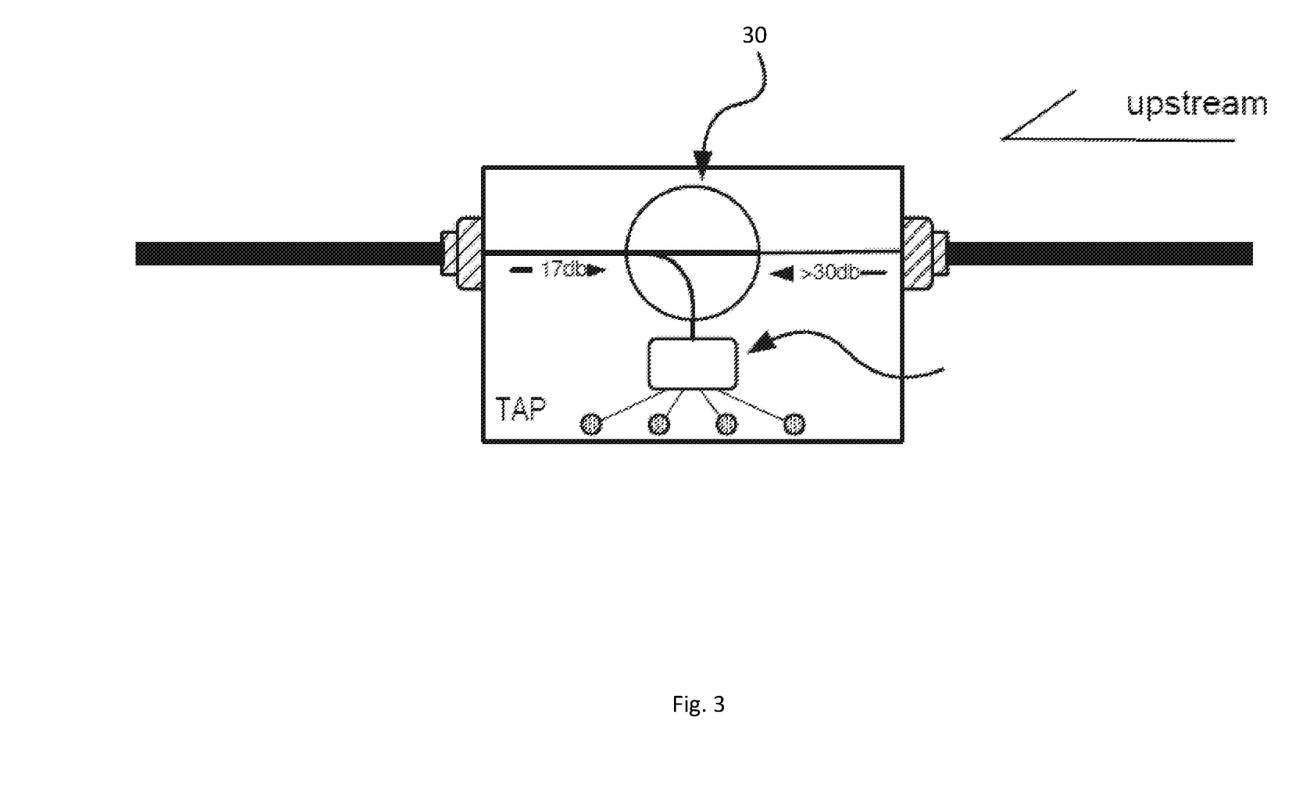
FIG. 3 illustrates a tap in accordance with one non-limiting aspect of the present invention.

FIG. 3 illustrates a tap 30 in accordance with one non-limiting aspect of the present invention. The tap 30 may be structurally similar to the splitter insofar as being a directional coupler capable of routing signaling therethrough between different inputs and outputs and differentiated from the splitter insofar as having different level of isolation/loss between inputs/outputs. The tap 30 is shown for exemplary purposes as having approximately 17 dB of loss when routing DS signaling, i.e., copying DS signaling traveling from left to right, and approximately at least 30 dB of loss when routing US signaling, i.e. copying US signaling traveling from right to left. The splitter may be distinguished from the tap 30 insofar as including equal loss/isolation between inputs and outputs such that the same amount of loss may be incurred regardless of whether signaling is traveling US or DS. The splitter and taps may have a sufficient amount of loss/isolation in the US such that US signaling with certain non-LCN signaling characteristics may essentially only pass through towards the CMTS 12, e.g., US messaging from the first CM 14 having non-LCN signaling characteristics may not include properties sufficient for relay to the third CM 26 or to the second CM 16. The signaling characteristics for some non-LCN messaging may be insufficient for the US messaging to travel in a direction other than towards the CMTS 12 such that the splitter and taps essentially isolate the US messaging to only travel towards the CMTS 12 even though there may be some leakage in the other directions, i.e., an insignificant or unusable amount of signaling may pass through to the other inputs/outputs.

One non-limiting aspect of the present invention contemplates leveraging the splitter and taps having some leakage or isolation breakdown for US/DS messaging by specifically generating signaling characteristics (LCN signaling characteristics) that cause messaging to usably pass through the splitter and taps without only being directed towards the CMTS 12. In this manner, messaging having sufficient signaling characteristics may originate from the first CM 14 and be directionally coupled to the third CM 26, the CMTS 12 and the second CM 16, i.e., the US message may be transmitted with LCN signaling sufficient to overcome or circumvent the expected or engineered loss/isolation of the splitter and taps such that the US message may be received by all devices in the path 20 and/or connected downstream of the CMTS 12. DS messaging and/or a combination of US and DS may operate in a similar manner to facilitate messaging or other types of communications between other CMs, such as with the use of DS messaging from the third CM 26 to the first CM 14 and US messaging from the first CM 14 to the third CM 26. (The CMTS 12 may be configured in such a manner to prevent further upstream passage of US messaging originating downstream thereof, however, the CMTS 12 may be alternatively be configured to do so without deviating from the scope and contemplation of the present invention.) The path 20 in FIG. 2 illustrates an exemplary path for a US message originating from the first CM 14 usably reaching the CMTS 12, the third CM 26 and the second CM 16 when transmitted with signaling characteristics sufficient to overcome isolation of interfering network componentry/elements. The signaling path 28 of the LCN 24 may be differentiated from the typical signaling path insofar as the US/DS messaging need not be relayed back from the CMTS 12 due to the signaling characteristics overcoming the isolation.

Figure 4:
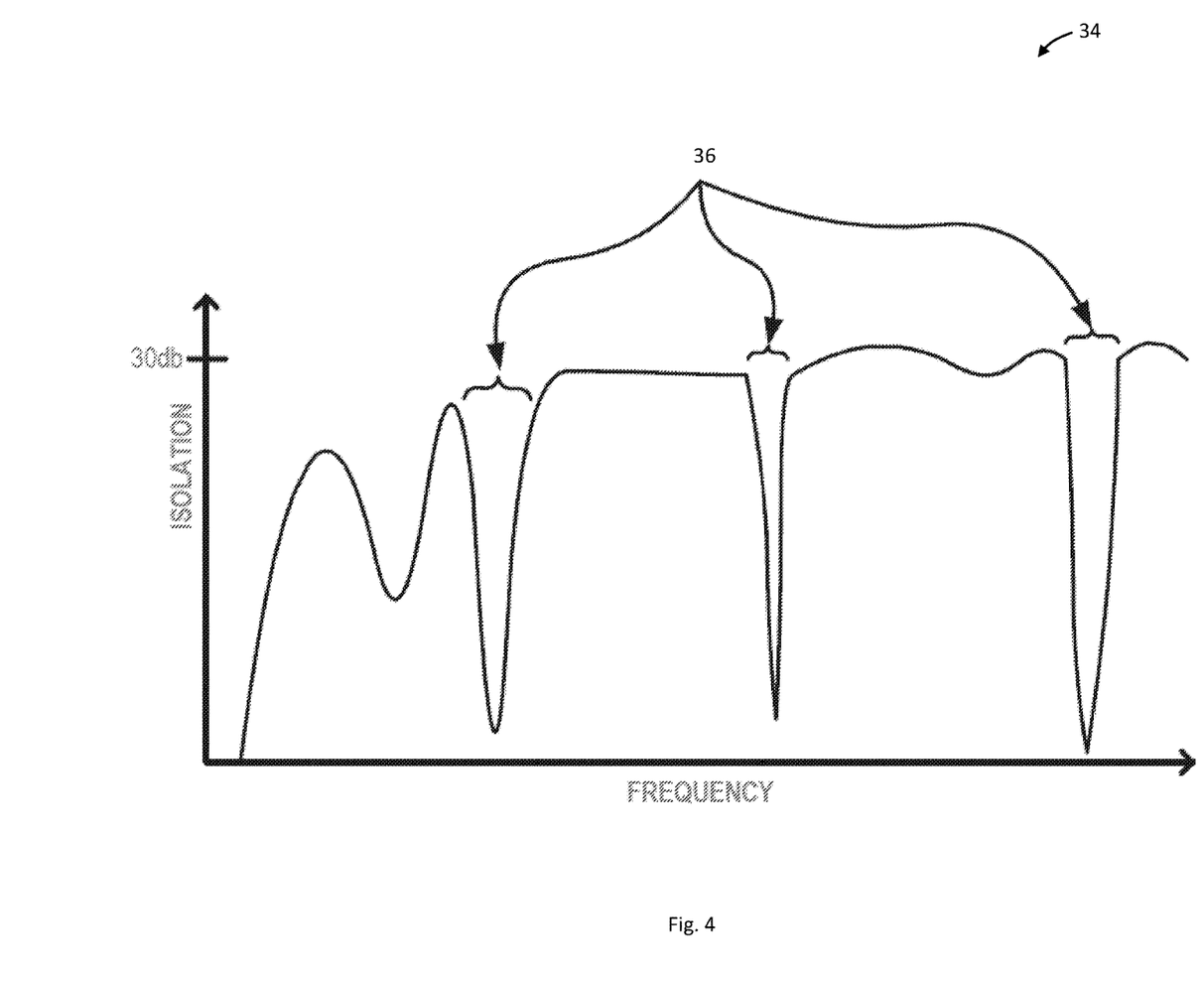
FIG. 4 illustrates an isolation graph in accordance with one non-limiting aspect of the present invention.

FIG. 4 illustrates an isolation graph 34 in accordance with one non-limiting aspect of the present invention. The isolation graph 34 may be utilized to facilitate determining signal characteristics and properties necessary to facilitate locally communicating messaging from one CM to another CM without relying on the CMTS 12 for relay. The isolation graph 34 may be generated as part of a channel sounding process or mapping whereby the CMTS 12 selectively instructs the CMs 14, 16, 26 to transmit test signals for purposes of measuring modulation error ratio (MER) or other metrics at the other CMs 14, 16, 26. The channel sounding may be an iterative process whereby each of the CMs 14, 16, 26 within a particular branch, commonly located downstream from the same CMTS 12 or otherwise positioned within the network 10 in a manner whereby the CMs 14, 16, 26 may be able to stress the network 10 to determine how signaling from each affects the other. The information collected from the channel sounding may be used to generate multiple isolation graphs for each of the CMs 14, 16, 26 relative to each of the other CMs 14, 16, 26 so as to provide a picture of interference/isolation within the network 10. The channel sounding may be used in this manner to determine interference groups sufficient to identify groupings of CMs 14, 16, 26 having active channels in the full-duplex or other bands that are susceptible to interfering with one another. The CMTS 12 can use the channel sounding to determine interference groups that can in turn be mapped into transmission groups for resource block allocation. An interference group can be made part of a transmission group comprised of non-overlapping downstream and upstream channels allocated to avoid upstream-to-downstream interference among CMs 14, 16, 26 in the same interference group.

The capability to determine CMs 14, 16, 26 capable of interfering with other CMs 14, 16, 26, i.e., CMs 14, 16, 26 within the same interference group, may be beneficial in some situations to avoid signal collisions and may also be beneficial in accordance with the present invention to identify signaling characteristics associated with signals capable of interfering with another CM 14, 16, 26. The ability to identify signaling characteristics capable of interfering with another CM 14, 16, 26 may be used to identify the CMs 14, 16, 26 capable of communicating with each other, i.e., if CMs 14, 16, 26 can interfere with each other at certain signaling characteristics, those signaling characteristics can be enhanced to usably communicate with each other. The CMTS 12 may generate the isolation graph from the channel sounding by working back the interference groups to identify the CMs 14, 16, 26 within each interference group capable of interfering with other CMs 14, 16, 26. The identification of interference between CMs 14, 16, 26 can then be leveraged to identify groupings of CMs 14, 16, 26 capable of facilitating local communications. If predicted or engineered losses, attenuation, etc. is sufficiently overcome to generate a usable signal, the CMs 14, 16, 26 may locally communicate with each other in accordance with the present invention. The CMTS 12 may generate many isolation graphs for each CM 14, 16, 26 in order to assess the relationship between each CM 14, 16, 26, and more particularly, signaling characteristics that produce inter-CMs interference and/or signaling characteristics that produce low levels of isolation relative to particular CMs 14, 16, 26. This capability to identify signaling characteristics that produce low levels of isolation may correspond with the LCN signaling characteristics needed to circumvent the loss and/or isolation provided by the splitter, taps or other devices within the network (e.g., amplifiers, filters, etc.).

The isolation graph 34 is shown to measure isolation on a vertical axis and frequency on a horizontal access for exemplary non-limiting purposes. The amount of isolation may increase along the vertical axis from top to bottom in order to illustrate an amount of isolation between two CMs 14, 16, 26 relative to various frequencies. The channel sounding process may include the CMTS 12 instructing the CMs 14, 16, 26 to iteratively transmit test signals at the various frequencies in order to populate the values in the isolation graph 34. The channel sounding may also include instructing the CMs 14, 16, 26 to transmit the test signaling at different power levels, codeword lengths, subcarrier spacing, modulation orders, etc. in order to develop a more detailed illustration of isolation between CMs 14, 16, 26 as a function of signaling characteristics. The channel sounding may include generating test signals throughout an entirety of the US/DS transmission capabilities of the CMs 14, 16, 26 in order to identify all possible signal combinations capable of being utilized to facilitate the local communications contemplated herein. While the present invention fully contemplates the channel sounding using DS signaling and/or the local communications using DS signaling, the use of US signaling may be more beneficial due to an ability of the CMTS 12 to schedule access to spectrum using minislots or a more granular level of specificity than is typically available for DS signaling as well as to utilize lower frequency regions, shorter and/or variable length codeword encapsulation, smaller subcarrier spacing, etc. than what may be available for DS signaling.

The signaling characteristics needed for one CM 14, 16, 26 to locally communicate with another CM 14, 16, 26 may vary depending on the network componentry dispersed therebetween such that any number of variables beyond the illustrated frequency may be included or utilized with the isolation graphs to identify appropriate signaling characteristics for local communications e.g., in the case of wireless signaling, the interference/isolation may be affected by unbounded or non-network type of devices like environmental infrastructures/obstructions and other wireless signals such that the isolation mapping may correspond with identifying signal parameters sufficient to overcome such obstacles. A number of regions 36 of the isolation map are shown to illustrate isolation windows where isolation levels at certain frequencies may be considered as low or below a threshold for isolation such that those windows 36 may be desirable for the local communications. The isolation windows 36 may be used to select frequencies most likely to overcome any inherent isolation from the network components with the least amount of signal manipulation, however, signaling may be transmitted at other frequencies or outside the isolation windows to facilitate local communications if the signaling includes other signaling characteristics capable of overcoming the attendant isolations, e.g., local communications may be facilitate outside of the isolation windows 36 when transmitted with greater power, decreased codeword lengths or higher/lower modulation than the signal would otherwise require if transmitted within one of the isolation window frequencies.

The isolation graphs 34 and other signaling information available to the CMTS 12 from the channel sounding and other network maintenance operations may be used in this manner to identify signaling properties sufficient to overcome isolating-type componentry within the network 10, which can then be used in accordance with the present invention to establish the LCN 24 and facilitate local communications. The local communication capabilities contemplated herein may be used to establish the LCN 24 the CMs 14, 16, 26 can use to communicate directly with each other without signal relay through the CMTS 12, i.e., the CMs 14, 16, 26 can transmit messaging or other signaling directly to each other using signaling properties and characteristics consistent with those that circumvent the inherent isolation in the network. While not needing to be party to the local communications for relay purposes, the CMTS 12, by way of the splitter passively relaying signaling thereto, may receive LCN messaging passing between the CMs 14, 16, 26 and optionally process or otherwise track that messaging in order to assess performance, measure usage and otherwise assess efficacy of the LCN 24. The CMTS 12 may allocate portions or subsets of spectrum available within the network for dedicated or on-demand use with the LCN 24 such that the CMTS 12 may monitor local communications over the LCN 24 to assess utilization of the LCN spectrum, which may be beneficial in increasing/decreasing/varying LCN spectrum according to usage or need.

Figure 5:
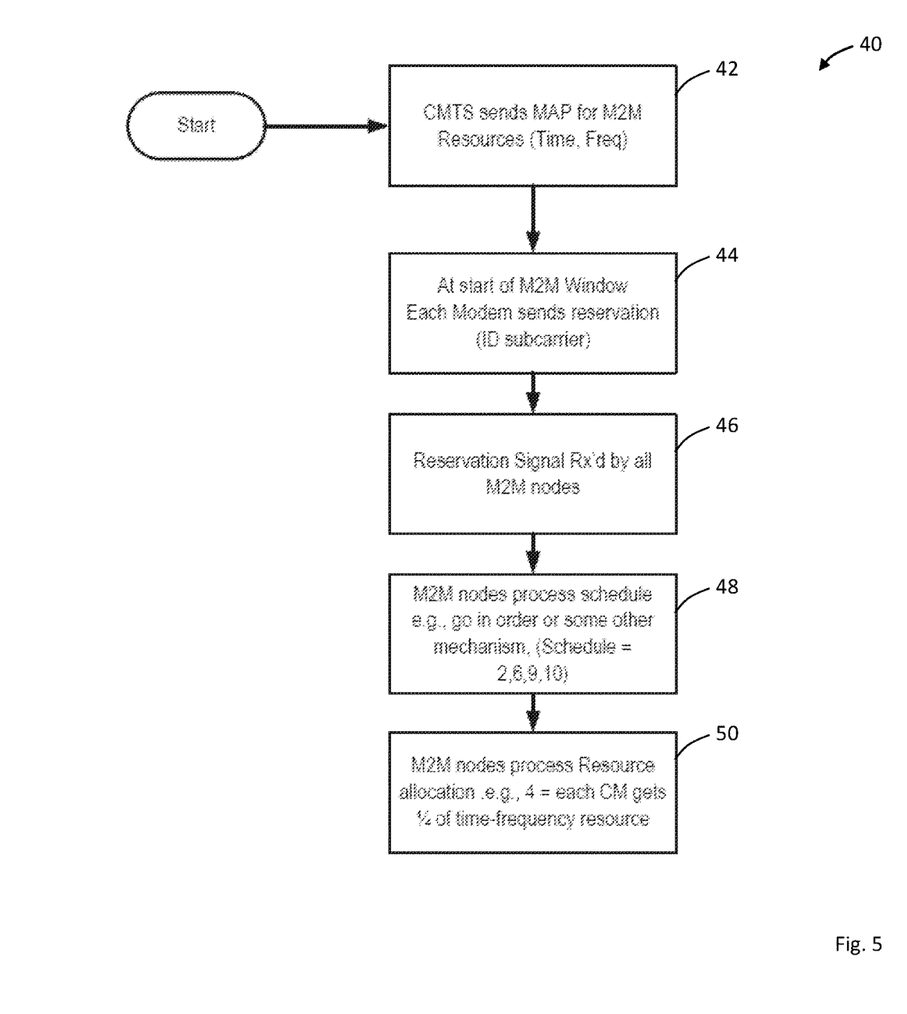
FIG. 5 illustrates a flowchart of method for locally communicating over a network in accordance with one non-limiting aspect of the present invention.

FIG. 5 illustrates a flowchart 40 of method for locally communicating over a network in accordance with one non-limiting aspect of the present invention. The method may be facilitated with a CMTS, CMs and/or other devices (e.g., controller) within a network having a processor capable of executing operations and other processes according to non-transitory instructions stored on a computer-readable medium and/or having other constructs or logical processing sufficient to facilitate the operations contemplated herein. The method is predominantly described with respect to facilitating local communications and/or establishment of a LCN within a subset or portion of a larger network wherein the portion may correspond with CMs or other devices connected in a tree-branch structure or other wired/wireless network arrangement where signaling paths may be available between the CMs without having to rely on a CMTS or other type of termination system to relay attendant messaging. The method contemplates leveraging the capabilities of the present invention to determine signaling characteristics sufficient to overcome isolation provided within the network by splitters, taps, etc. and using that information to facilitate local communications whereby messaging may be transmitted directly between CMs without having to be relayed with the CMTS. The method is predominantly described with respect to a cable infrastructure for exemplary non-limiting purposes as the present invention fully contemplates its use and application in non-cable infrastructures or environments using other types of end devices and/or termination systems, such as cellular or Wi-Fi networks employing access points (APs), end stations, eNodeBs, etc.

Block 42 relates to operations associated with determining signaling characteristics necessary within the LCN to circumvent or otherwise overcome isolation provided by splitters, taps, etc. in a manner capable of enabling local communications between CMs (M2M). The attendant processing may include analyzing resources within the LCN to determine isolation maps, interference levels and/or other information related to locally communicating messaging in an M2M manner. One non-limiting aspect of the present invention contemplates the CMTS assessing signaling interactions between the CMs and identifying the needed resources, such as according to information collected with a channel sounding process. While any number of signaling parameters may be determined by the CMTS to facilitate communications over the LCN, the processing is illustrated for exemplary purposes with respect to the CMTS determining or allocating a subset of spectrum available within the network for the LCN, such as by variably allocating a portion of the available spectrum defined according to time and frequency for LCN communications, which may be referred to as LCN spectrum. While the LCN spectrum, or more particularly the time and the frequencies associated therewith, may be varied, discontinuous and adjusted according to demand or need, one manner for allocating the LCN spectrum may be facilitated using a bandwidth/spectrum allocation mapping based on the isolation graphs.

The isolation windows for each combination of CMs may be analyzed to determine one or more isolation windows the CMs share in common such that the LCN spectrum may be selected to fall within frequency ranges where each frequency indicated for the LCN coincides with a frequency within one of the isolation windows, regardless of the transmitting CM or the one or more receiving CMs. The allocation of LCN spectrum in this one-size-fits-all manner may be beneficial in ameliorating the processing demands associated with assessing LCN signaling characteristics in comparison to selecting the LCN spectrum on a per M2M basis, i.e., the LCN spectrum may be selected for all CMs as opposed to being selected each time one CM desires to message another one or more CMs. As described in more detail below, the present invention fully contemplates a more granular approach to assigning LCN spectrum on a per-communication basis or on a per-M2M basis whereby suitable LCN signaling characteristics may be determined and/or allocated each time one CM desires to communicate with another one or more CMs. While specific messaging may be utilized, one non-limiting aspect of the present invention contemplates communicating the LCN spectrum and/or additional signaling parameters (e.g., modulation order, code length, power, etc.), which collectively may be referred to as LCN parameters, to the CMs in a bandwidth allocation map (MAP), such as the MAP used in DOCSIS for bandwidth allocation whereby one or more segments, symbols, minislots, etc. of the MAP may be allocated as LCN spectrum.

Block 44 relates to operations associated with a reservation process where the CMs process the MAP to identify a reservation window. The reservation window may correspond with a time and/or frequency specified within the MAP for the CMs desiring local communications to request access to the LCN spectrum. Each CM desiring use of the LCN may transmit a request in the form of a reservation, such as one having an ID subcarrier, in order to indicate a desire to transmit LCN messaging or otherwise utilize the LCN for communication purposes. Block 46 relates to operations associated with the CMs receiving reservation signals from the other CMs that may also be transmitting the reservations for purposes of attempting to access the LCN. The CMs may perform a contention process or other suitable process for determining when the reservation window is clear for transmission of a reservation. The reservation/ reservation signaling may be transmitted to the CMTS for relay to the other CMs or optionally transmitted within the LCN spectrum and/or using other signaling properties sufficient to facilitate direct communication of the reservations to each of the CMs within the LCN, i.e., without having to rely on the CMTS to relay the reservation to the other CMs.

The CMs may determine a need for making a reservation in response to receiving data, instructions or other information from CPE connected thereto and/or according to applications or other processes executing thereon. The present invention contemplates use of the LCN to facilitate P-to-P and/or broadcast/multicast communications between the CMs to facilitate ameliorating the inefficiencies associated with relying on the CMTS to relay messaging from one CM to another CM, e.g., to eliminate the up to 200 miles of travel in inefficiencies associated with relay messaging through the CMTS. The efficiencies gained may improve latency, reduce bandwidth consumption, provide greater quality of service (QoS) and/or enable CMs/CPE to engage in activities, particularly activities dependent on high data rates or low latency, that the CMs/CPE would otherwise be unable to engage or adequately support if the attendant messaging required relay through the CMTS or other such intermediary. Virtually any application or operation capable of utilizing the inefficiencies gained by avoiding relay through the CMTS may benefit from use of the LCN, particularly when backhaul of large amounts of traffic between local CMs is needed.

Blocks 46, 58 relates to operations associated with establishing a schedule for transmission of the messaging the CMs making the reservations desire to locally communicate over the LCN. The scheduling may be based on a priority system whereby certain CMs are granted priority over other CMs based on subscription (e.g., purchasers of enhanced subscriptions may be given priority over lower subscribers), message type (e.g. emergency messaging may be provided priority over non-emergency messaging), amount of data/ traffic (e.g., access to the LCN spectrum may be proportioned to the amount and/or time of traffic needing transmission), etc. The scheduling may also be based on an egalitarian system whereby access to the LCN spectrum may be equally distributed amongst all reserving CMs, such as by dividing up the LCN spectrum equally to each reserving CMs (e.g., total bandwidth/spectrum divided by number CMs) and/or allocating discrete amounts of the LCN spectrum per CMs (e.g., each CMs may be allocated X amount of time and X amount of frequency (bandwidth)). The scheduling may also be based on a contention process whereby the devices transmitting the reservation may execute backoff timers or other contention-based processes to determine when the LCN spectrum is free for use. The scheduling may be self-directed by the CMs such that each CM individually schedules its own local transmissions based on the reservations seen from the other CMs, which may be accomplished by the CMs individually executing a scheduling process according to the desired priority system.

Block 50 relates to operations associated with generating a resource allocation for the CMs making the reservations. The resource allocation may identify the portions of LCN spectrum to be utilized by each CM desiring to locally communicate messaging over the LCN and/or additional signaling parameters/characteristics to be used by the CMs to ensure the LCN transmissions are sufficient to overcome isolation, losses, etc. associated with any isolating type of devices within the LCN, which the CMs may individually determine from information included within the MAP or through subsequent instructions from the CMTS. FIG. 5 illustrates an exemplary resource allocation whereby the LCN spectrum may be equally divided amongst each reserving CM, which is shown to correspond with four CMs making reservations such that ¼ of the LCN spectrum is divided equally amongst the reserving CMs. The reserving CMs may identify from the resource allocation a time and a frequency reserved for them to transmit any desired messaging locally over the LCN and the signaling characteristics needed to ensure receipt at the desired CM(s). The transmitted messaging may include addressing and/or other information for the receiving CMs to identify itself as the intended recipient and for other non-intended recipients receiving CMs to understand the messaging should be ignored.

The method described with respect to FIG. 5 contemplates the CMTS setting aside one or more continuous or discontinuous portions of spectrum available within the network for LCN communications, e.g., setting aside a portion of network spectrum as LCN spectrum. Once the LCN spectrum is set aside and the CMs are notified of it, the CMs may transmit reservations and execute a self-scheduling process to determine according to time and/or frequency or other signaling characteristics when each may be authenticated for transmitting messaging over the LCN. This type of process whereby the CMTS identifies the LCN spectrum and the CMs self-direct the use thereof may be beneficial in ameliorating back and forth messaging with the CMTS and/or otherwise speed the decision-making processing associated with the CMs determining when to transmit messaging over the LCN. While the present invention contemplates leveraging the benefits associated with ameliorating messaging with the CMTS when communicating over the LCN, there may be some situations where it may be beneficial for the CMTS to provide more granular control of the LCN, such as by requiring the CMs to request the CMTS for use of the LCN each time the CMs have a desire to transport messaging thereover.

Figure 6:
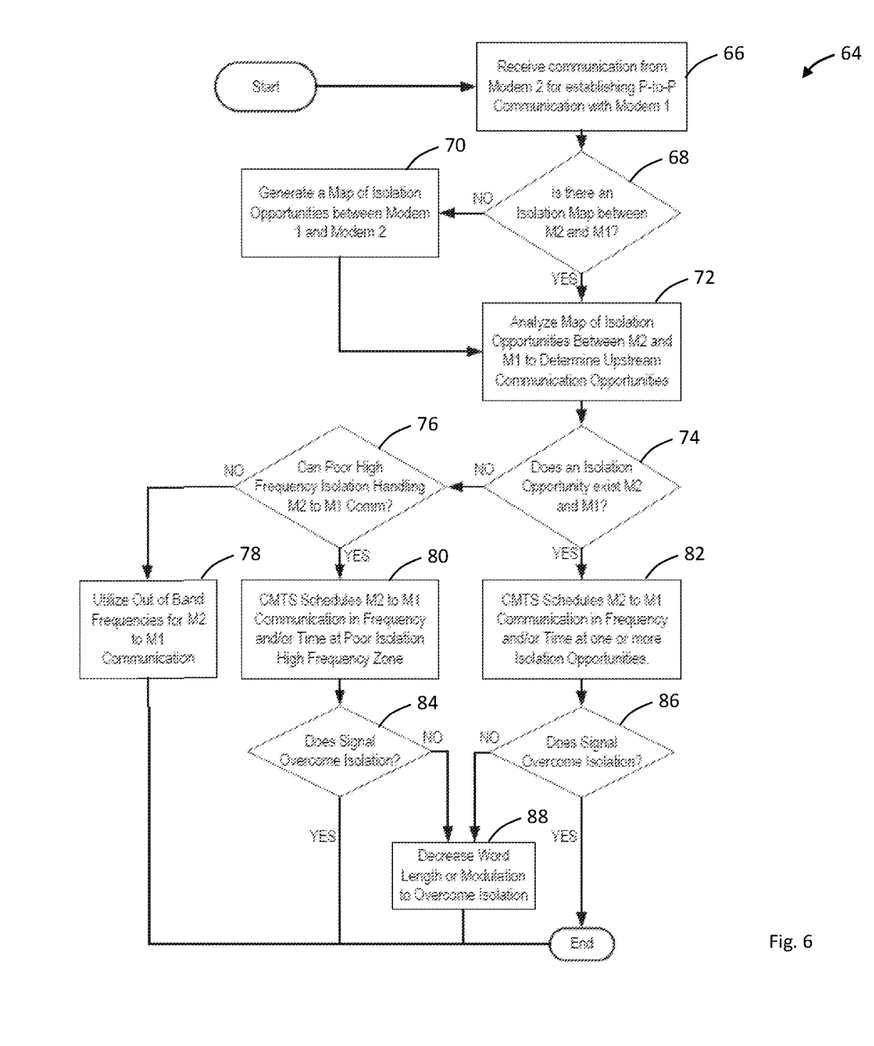
FIG. 6 illustrates a flowchart of method for locally communicating over a network in accordance with one non-limiting aspect of the present invention.

FIG. 6 illustrates a flowchart 64 of method for locally communicating over a network in accordance with one non-limiting aspect of the present invention. The method may be distinguished from the method of FIG. 5 insofar as the CMs individually requesting the CMTS for use of the LCN. Blocks 66-68 relate to operations associated with a CM requesting the CMTS for establishing LCN communications with another CM (Block 66) and the CMTS determining whether an isolation graph exists for communications between the two CMs (Block 68). Blocks 70-74 relate to operations associated with the CMTS generating an isolation map if one has not already been generated (Block 70) and analyzing the isolation map to determine whether US/DS communication opportunities exist (Blocks 72-74), e.g., the existence of one or more isolation windows within the isolation graph where isolation levels between the two CMs may be below a threshold desired for local communications. Blocks 76-80 relate to operations associated with the CMTS determining the lack of a suitable isolation window or suitable level of interference between the CMs and whether certain types of signaling may nonetheless be suitable for communicating the messaging over the LCN, e.g., using out of band (00B) frequency/signaling (Block 78)

or using signaling within the available spectrum but outside of an isolation window (Block 80). Block 82 relates to operations associated with transmitting messaging over the LCN according to signaling characteristics associated with a suitable isolation window or isolation opportunity derived from the isolation graph.

The CMTS may provide suitable instructions to the CMs originating the messaging to facilitate the signaling characteristics needed for transmitting messaging over the LCN according to the parameters determined above. Blocks 84-86 relate to processes associated with determining whether signaling transmitted with poor isolation (Block 84) or signaling associated with desired isolation or an isolation window (Block 86) may be sufficient to facilitate transmitting the messaging over the LCN, i.e., whether the signaling instructions provided from the CMTS may be sufficient to overcome expected loss, attenuation, etc. for the originating CMs to usably communicate over the LCN with the destination CMs. Block 88 relates to operations associated with the CMTS providing the CMs instructions for decreasing word length and/or modulation in order to overcome any deficiencies in the transmitted signaling in the event of unsuccessful message transmission over the LCN. The capability of the CMTS to individually instruct the CMs with respect to communications over the LCN may be beneficial in ameliorating the amount of spectrum being allocated for the LCN so as to ensure the amount of spectrum is actually being used for communications as opposed to being set aside in advance where the set-aside spectrum may go unused or underutilized. The method associated with FIGS. 5 and 6 contemplate different interactions with the CMTS for exemplary non-limited purposes as some of the operations and processes associated therewith may be combined to otherwise facilitate local communications, such as by enabling CMs to request a non-demand access to the LCN when dedicated LCN spectrum is unavailable, i.e., to request additional spectrum when the dedicated LCN spectrum is already consumed.

As supported above, the present invention contemplates overcoming inefficiencies associated with indirect messaging resulting in signaling traveling a longer path to a destination than the signaling would otherwise have to travel if a more direct path was taken. The contemplated LCN may be of the type whereby messaging, signaling, information, etc. can be more directly communicated between end devices over wired and/or wireless infrastructures, particularly in light of interference/isolation within the attendant wired and/or wireless infrastructure being addressed to determine how the end devices may communicate with each other within the overall bandwidth/spectrum allocation of the network, e.g., without having to permanently reserve or otherwise indefinitely dedicate spectrum for the LCN and without having to change or redeploy network infrastructures. The capability of the present invention to facilitate wired and/or wireless types of local communications within a deployed network according to an assessment of isolation/interference associated with deployed/fixed network devices having determinable isolation, directional coupling, loss, attenuation, etc. may be particularly beneficial in enabling use of the LCN in virtually any environment without having to make substantial infrastructural changes thereto.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for locally communicating over a network, the network utilizing a cable infrastructure to facilitate communications between a cable modem termination system (CMTS) and a plurality of cable modems (CMs), the method comprising:
   allocating a portion of spectrum available within the network for local communications such that messaging within the portion are exchanged between the CMs without reliance on the CMTS for relay;
   determining isolation mapping for the network, the isolation mapping detailing isolation levels between the CMs according to frequency; and
   selecting the portion to coincide with frequencies within the isolation mapping having low levels of isolation; and
   determining the low levels of isolation to correspond with portions of the isolation mapping having isolation less than a threshold.

2. The method of claim 1 further comprising providing signaling parameters to facilitate transmission of the messaging as a function of loss anticipated to occur from one or more directional couplers included within the network.

3. The method of claim 1 further comprising implementing a reservation process for controlling access to the portion, the reservation process allocating segments of the portion for use by the CMs desiring to transmit the messaging, the segments being defined according to at least time and frequency.

4. The method of claim 3 further comprising determining the CMs desiring to transmit the messaging according to reservations transmitted from the CMs during a reservation window included as part of the reservation process.

5. A method for communicating over a network comprising:
   instructing devices within the network to transmit non-local messaging to a termination system for indirect relay;
   instructing devices within the network to transmit local messaging directly to other devices without relay through the termination system;
   determining spectrum available within the network;
   allocating a first portion of the spectrum for the non-local messaging; and
   allocating a second portion of the spectrum for the local messaging.

6. A method for communicating over a network comprising:
   instructing devices within the network to transmit non-local messaging to a termination system for indirect relay;
   instructing devices within the network to transmit local messaging directly to other devices without relay through the termination system;
   determining spectrum available within the network;
   allocating a first portion of the spectrum for the non-local messaging;
   allocating a second portion of the spectrum for the local messaging; and
   instructing the devices to execute a reservation process before transmitting the local messaging within the second portion.

7. The method of claim 6 further comprising the devices executing the reservation process in a self-directed manner whereby the devices individually execute a contention process or priority process for determining when and how to wirelessly transmit the local messaging.

8. The method of claim 6 further comprising the devices executing the reservation process in a directed manner whereby the termination system provides instructions to devices indicating when and how to transmit the local messaging.

9. A method for local communications within a cable network comprising:
   generating isolation mapping for a plurality of cable modems (CMs) associated with a cable modem termination system (CMTS);
   processing the isolation mapping to determine signaling characteristics needed for the CMs to overcome isolation associated with one or more splitters and/or taps included within the cable network;
   instructing the CMs to locally communicate messaging therebetween according to the signaling characteristics such that the messaging traverses the cable network without relying on the CMTS for relay; and
   instructing the CMs to execute a reservation process for determining a time and a frequency for locally communicating the messaging.

10. The method of claim 9 further comprising instructing the CMs to relay non-local messaging through the CMTS.

11. The method of claim 10 further comprising instructing the CMs to transmit the non-local messaging without performing the reservation process.

12. The method of claim 9 further comprising generating the signaling characteristics to include properties sufficient for usably transmitting the messaging in expectation of loss, attenuation and/or degradation associated with the one or more splitters and/or taps.

13. The method of claim 9 further comprising instructing one of the CMs to locally re-transmit one of the messaging using decreased word length and/or modulation in response to the signaling characteristics being sufficient to overcome the expected loss, attenuation and/or degradation.

* * * * *